United States Patent [19]

Lovley

[11] Patent Number: 5,324,491
[45] Date of Patent: Jun. 28, 1994

[54] ENZYMATIC REDUCTION AND PRECIPITATION OF URANIUM

[75] Inventor: Derek R. Lovley, Paris, Va.

[73] Assignee: The United States of America as represented by the Secretary of the Interior, Washington, D.C.

[21] Appl. No.: 862,164

[22] Filed: Apr. 3, 1992

[51] Int. Cl.$^5$ .............................................. C01G 43/00
[52] U.S. Cl. ............................................ 423/11; 423/3; 423/6
[58] Field of Search ................... 423/11, 261, 3, 6

[56] References Cited
U.S. PATENT DOCUMENTS

| | | | |
|---|---|---|---|
| 2,866,680 | 12/1958 | Long | 423/11 |
| 4,108,722 | 8/1978 | Stover | 423/17 |
| 4,260,193 | 4/1981 | Stover | 423/17 |
| 4,436,704 | 3/1984 | Krennrich et al. | 423/11 |
| 4,530,763 | 7/1985 | Clyde et al. | 423/3 |
| 4,649,029 | 3/1987 | Nirdosh | 423/3 |

Primary Examiner—Edward A. Miller
Attorney, Agent, or Firm—E. Philip Koltos

[57] ABSTRACT

A method for removing uranium from uranium contaminated water involves adding uranium reducing microorganisms and an electron donor to uranium contaminated water to reduce U(VI) in the uranium contaminated water to U(IV) which in turn forms a $UO_2$ precipitate The $UO_2$ precipitate is then separated from the contaminated water.

9 Claims, 5 Drawing Sheets

ENZYMATIC REDUCTION AND PRECIPITATION OF URANIUM

BACKGROUND OF THE INVENTION

1. Field of the Invention

The present invention relates to a biological method for removing uranium from water.

2. Prior Art

Two biological methods have been previously described for removing uranium from water. One method is biosorption. In this technique the water is passed through the biomass of living or dead, usually dead, bacteria, fungi, yeast or algae. The uranium binds to the biomass through passive physical-chemical mechanisms. Microbial enzymatic activity is not directly involved. Patents which describe biosorption processes include U.S. Pat. No. 4,789,481 to Brierly et al and U.S. Pat. No. 4,530,763 to Clyde et al.

A major disadvantage of the biosorption method is that in most waters uranium is in a carbonate complex and uranium in such a complex does not readily adsorb onto biomass. Other disadvantages of biosorption methods include: 1. The limited capacity of biomass for uranium sorption. 2. The fact that other metals and cations may compete with uranium for adsorption sites and limit the extent of uranium adsorption. 3. The fact that biomass is expensive to generate and the method is only cost effective if waste biomass from some other process can be obtained. 4. The biosorbed uranium represents a large volume of waste of which only a fraction is uranium. 5. Although it is possible to regenerate some forms of biomass by extracting the uranium with salt solutions or acids, this extraction is expensive and can result in a large volume of corrosive, uranium containing waste. 6. Biosorption only poorly extracts uranium when it is present at low concentrations.

A second biological method for removing uranium from waters is to add glycerol-2-phosphate to the uranium-containing water and then treat the water with the microorganism *Citrobacter* sp. *Citrobacter sp.* has a phosphatase enzyme that releases phosphate from the glycerol-2-phosphate. The phosphate then forms an insoluble uranium precipitate on the cell surface.

Although this process involves an enzymatic reaction, the enzymatic reaction does not involve uranium. Disadvantages of this method are similar to those with biosorption: 1. It is hindered by the presence of carbonate. 2. It precipitates metals, other than uranium, that form an insoluble phosphate complex. 3. The amount of uranium that can be sorbed onto the cell surface is limited. 4. The sorbed uranium represents a large volume of waste of which only a fraction is uranium.

A nonbiological method that has been used for removing low levels of uranium from waters is ion exchange. In this method uranium is adsorbed onto various ion exchange resins. Disadvantages of this method are: 1 The ion exchange material has a limited capacity for adsorption. 2. Other metals and ions are adsorbed which limits the effectiveness and lifetime of the ion exchange material for uranium. 3. Uranium held in complexes may not be extracted with ion exchange materials. 4. Uranium adsorbed onto the ion exchange material produces a large volume of waste that must be disposed of, with only a small portion of the volume actually comprised of the uranium. 5. Removal of the uranium from the ion exchange material with high concentrations of salt or acid produce a highly corrosive uranium-containing waste and the use of such extractants is expensive. 6. Ion exchange resins only poorly extract uranium from water when uranium as in low concentrations. 7. Ion exchange materials are expensive.

SUMMARY OF THE INVENTION

It is an object of the present invention to avoid the disadvantages of prior methods of removing uranium from uranium contaminated water.

In accordance with the invention, a method as provided for removing uranium from uranium contaminated water comprising:

adding uranium reducing microorganisms to uranium contaminated water;

adding an electron donor to the uranium contaminated water;

reducing U(VI) in the uranium contaminated water to U(IV) which in turn forms a $UO_2$ precipitate;

separating the $UO_2$ precipitate from the contaminated water.

Other features and advantages of the invention will be set forth in, or apparent from, the detailed description of the invention which follows.

DETAILED DESCRIPTION OF THE INVENTION

Figure 1:
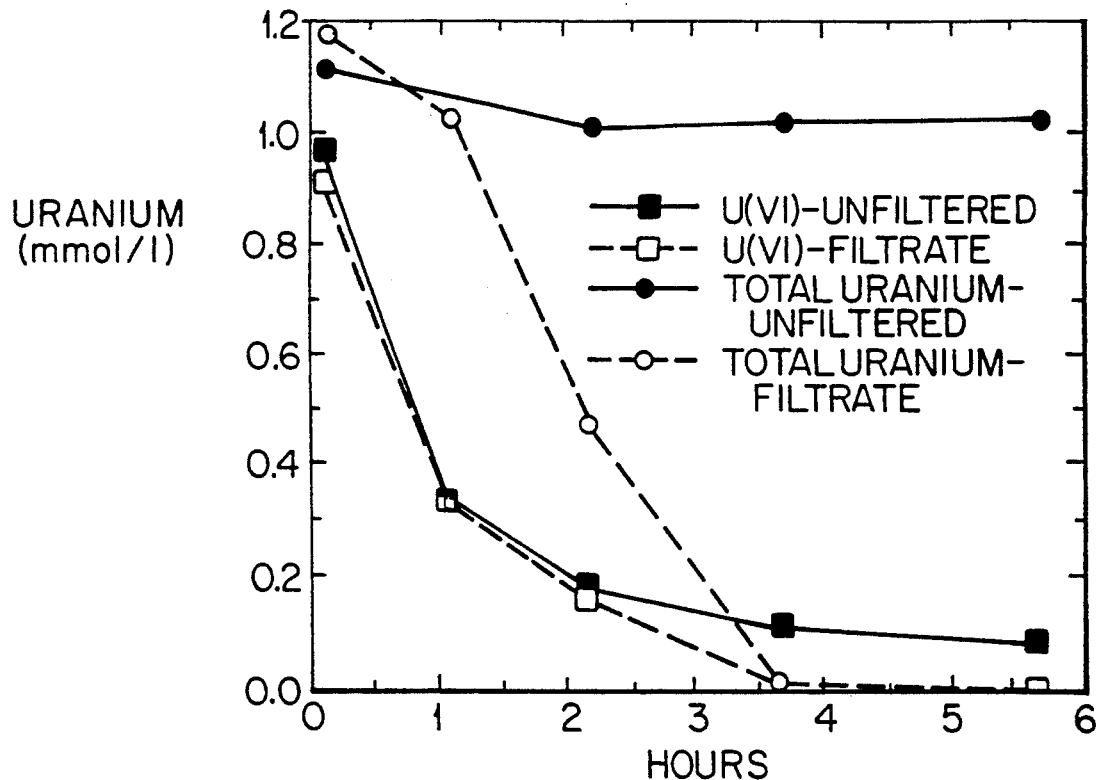
FIG. 1 is a graph showing the conversion of U(VI) to an insoluble form using the microorganism *D. desulfuricans* in the method of the present invention.

In the present invention, microorganisms are used to purify uranium contaminated water and waste streams. Preferred microorganisms which can be used in the method of the present invention include the iron-reducing organisms *Geobacter metallireducens* and *Shewanella* (formerly *Alteromonas*) *putrefaciens* and the sulfate-reducing microorganisms *Desulfovibrio desulfuricans* and *Desulfovibrio vulgaris*.

When the uranium reducing microorganisms and an electron donor are placed in waters containing dissolved U(VI), the U(VI) is reduced to U(IV) which precipitates from solution. The formation of such a precipitate is described in Gorby, Y. A. and D. R. Lovley, "Enzymatic Uranium Precipitation", *Environ. Sci. Technolol.*, Vol. 26, No. 1, 1992, and in Lovely, D. R.

and E. J. P. Phillips, "Reduction of U(VI) by *Desulfovibrio desulfuricans*" in *Appl. Environ. Microbiol.*, 992, 58, 850–856, the entire disclosures of which are hereby incorporated by reference. The method of the present invention can be practiced in a number of different ways.

In one preferred embodiment, the method of the present invention can be carried out in a bioreactor. The bioreactor can be any of a variety of culture vessels in which the microorganisms are either free-floating or are attached to any of a variety of solid supports. An electron donor such as hydrogen or an appropriate organic compound such as acetate or lactate is added to the reactor. The uranium containing water enters the reactor, the uranium is reduced and precipitates to the bottom of the reactor. The precipitation of uranium from water and the removal of the uranium by filtration is described in Gorby, Y. A. and Lovley, D. R. "Enzymatic Uranium Precipitation", in *Environ. Sci. Technology* and in Lovley, D. R. and E. J. P. Phillips, "Reduction of U(VI) by *Desulfovibrio desulfuricans*" in *Appl. Environ. Microbiol.*, the entire disclosures of which are hereby incorporated by reference.

In another preferred embodiment, the uranium reducing microorganisms are placed in a chamber where they are separated from the uranium contaminated water by a semi-permeable membrane. The membrane does not permit the passage of the microorganism. In this embodiment, U(VI) diffuses across the membrane and into the chamber containing the uranium reducing microorganisms where it is reduced to U(IV) and precipitated. Dialysis tubing can be used as the semipermeable membrane.

In another preferred embodiment the uranium reducing microorganisms can be attached to or embedded on solid supports which are packed into a column. The uranium contaminated water is then passed through the column where the U(VI) is reduced and precipitated.

Where the uranium contaminated water is ground water, the uranium reducing microorganisms along with a suitable electron donor can be injected into the subsurface at a specific site. As the groundwater moves through the injection zone, the uranium precipitates thereby preventing further uranium migration. Alternatively, the uranium reducing microorganisms contained within a semi-permeable membrane can be placed in the bottom of wells along the flow path of uranium contaminated waters. Uranium reduction within the semipermeable membrane removes uranium from the groundwater and the uranium precipitate is retrieved by bringing the semi-permeable membrane chamber back to the surface.

The method can also be used with uranium contaminated soils and uranium solid wastes, such as tailings. The uranium contaminated solids are washed (leached) in a bicarbonate solution which extracts the uranium from the solids and forms a solution. The solution is then passed through a bioreactor containing the microorganisms.

The preferred temperature for the present method is between about 4° and 50° C., most preferably between 30° and 35° C. to increase the effectivity of the microorganisms. However, the temperature chosen depends on the microorganism used. Preferably the microorganisms are maintained at a relatively neutral pH of about 0 to 8.

Electron donors which can be used in conjunction with the microorganisms of the present invention include acetic acid for strain *Geobacter metallireducens;* hydrogen, formate, lactate, and pyruvate for *Shewanella putrefaciens;* and hydrogen, and lactate for *Desulfovibrio desulfuricans.*

An important distinction between the method of the present invention and prior methods is that the uranium in the contaminated water directly reacts with the uranium-reducing system within the microorganisms used in the method of the invention. A major advantage of the present invention is that the enzymatic reduction can precipitate uranium that is held in carbonate complexes whereas sorption methods often do not. This is important because in most waste waters uranium is in the form of carbonate complexes. Furthermore, other liquid uranium wastes such as those resulting from in situ uranium mining, uranium processing and the soil washing technique described above, contain uranium in a carbonate complex. Uranium chelated to other compounds such as organic chelators can also be reduced.

A second major advantage of the method of the present invention is that the uranium is precipitated from solution in a highly concentrated and pure form. This is because the enzymatic uranium reduction reaction is highly specific for uranium and because the uranium precipitate does not bind to the cell biomass. Since the uranium is much more dense than the cells, the uranium rapidly settles out to form a chemically pure precipitate. Thus, this technique recovers the uranium in a highly compact and easily handled solid form.

The fact that the uranium does not bind to the cells means that uranium removal is not limited by the availability of cell binding sites as it is in biosorption techniques. Thus the amount of uranium that can be removed per gram of uranium reducing microorganism is much greater.

With the enzymatic reduction method of the present invention, it is possible to perform in situ immobilization of uranium in subsurface environments by injecting the organisms underground. This kind of procedure cannot be done with biosorption methods, because injecting high quantities of biomass into groundwater would plug pore spaces for groundwater flow and because the biomass sorbing the uranium would eventually be degraded by other microorganisms with the release of the uranium back into the water.

The enzymatic reduction method of the present invention also affords the possibility of simultaneously treating the organic components in wastes which contain organic contaminants as well as uranium. A variety of organic contaminants may serve as an electron acceptor for Fe(III) reduction in the metal-reducing microorganism strain *Geobacter metallireducens.* Thus, it is possible for uranium-reducing microorganisms to degrade organic contaminants by oxidizing them to carbon dioxide with concurrent reduction and precipitation of uranium.

In some instances biosorption of uranium can be inhibited by the presence of contaminating ions such as $Fe^{+2}$, $Mn^{+2}$, $Mg^{+2}$, $Ca^{+2}$, $Zn^{+2}$, $Ca^{+2}$, $SO_4^{-2}$, $Co^{+2}$, $Cu^{+2}$ and $Ni^{+2}$. However, the method of the present invention is generally not significantly affected by the presence of these ions.

The present invention will now be described by way of example:

EXAMPLE

Materials and Methods

The U(VI)-reducing microorganism *D. desulfuricans* (ATCC #29577) was obtained from the American Type Culture Collection in Rockville, Md. Of the microorganisms *D. desulfuricans, D. vulgaris, Geobacter metallireducens* and *Shewanella putrefaciens, D. desulfuricans* is the easiest to culture in large quantities.

Standard anaerobic techniques described in Balch, W. E., Fox, G. E., Magrum, L. J., Woese, C. R., Wolfe, R. S. *Microbiol. Rev.* 1979, 43, 260–296; Hungate, R. E., *Methods Microbiol.* 1969, 3B, 117–132 and Miller, T. L., Wolin, M. J. *Appl. Microbiol.*, 1974, 27, 985–987 were used throughout the culturing procedure. Gases were passed through a column of hot reduced copper filings to remove traces of oxygen. *D. desulfuricans* was grown in an anaerobic medium with lactate as the electron donor and sulfate as the electron receptor as described in Lovley, D. R. and Phillips, E. J. P., *Appl. Environ. Microbiol.*, 992, 58, 850–856.

Cells were collected by centrifugation under an atmosphere of $N_2$—$CO_2$ (80:20). The cell pellet was resuspended in anaerobic bicarbonate buffer (2.5 g sodium bicarbonate per liter), centrifuged and then resuspended in bicarbonate buffer (10 ml) in 25 ml serum bottles in order to provide ca. 1–5 mg of cell protein. The gas phase was $N_2$—$CO_2$. The pH was 6.8. The serum bottles were sealed with thick butyl rubber stoppers.

When noted U(VI) was provided in the form of U(VI) acetate. In general, the source of U(VI) was a 10 mM stock solution in bicarbonate buffer. However, when high initial concentrations (>1 mM) of U(VI) were used, the uranyl acetate was added directly to the buffer in the serum bottles Lactate (10 mM from a 100 mM anaerobic stock) or $H_2$ (10 ml) were added as the electron donor. The potential of various anions and metals to inhibit U(VI) reduction was investigated by adding each potential inhibitor from a concentrated anaerobic stock (1 mM) in order to provide a final concentration of 100 μM. The sodium or chloride salts were used except in the case of Fe(II) which was added as ferrous sulfate. The cell suspensions were incubated at 35° C. in the dark unless otherwise noted.

Studies with Semi-Permeable Membrane

A study was conducted to determine if *D. desulfuricans* contained within a semipermeable membrane could remove U(VI) from the bulk, external solution. Under $N_2$—$CO_2$, a cell suspension of *D. desulfuricans* (1.5 mg cell protein) was loaded into a cylindrical dialysis membrane (7.6 mm di×7 cm length, molecular weight cut-off, 50,000) tied off at one end. The other end of the membrane was tied off and the sack containing the cells was placed into an anaerobic pressure tube which contained bicarbonate buffer (15 ml) with 0.4 mM U(VI) and lactate (10 mM). Other tubes received additions of heat-killed cells (20 min, 80° C.) or only buffer with no cells. The tubes were sealed with thick butyl rubber stoppers. The water outside the dialysis sack was sample over time for U(VI) with a syringe and needle.

Preparation of Freeze-Dried Cells

Cells which were harvested and washed in bicarbonate buffer as described above were resuspended in bicarbonate buffer and mixed with an equal volume of bicarbonate buffer containing 24% (wt/vol) sucrose. This suspension was frozen in an ethanol/dry ice bath and then freeze-dried overnight.

Uranium Contaminated Waters

Drainage water from an inactive uranium mine was provided by the Bureau of Mines. Uranium containing groundwaters from the Department of Energy site in Hanford, Washington were provided by Pacific Northwest Laboratories.

Analytical Techniques

U(VI) was measured under anaerobic condition with a Kinetic Phosphorescence analyzer (KPA-10, Chemchek Instruments), which uses a pulse nitrogen dye laser and a complexing agent to measure U(VI) in solution. In order to determine the total amount of uranium, samples were oxidized under air in order to convert U(IV) to U(VI). Filterable U(VI) and U(IV) were determined after anaerobically filtering the sample through a 0.2 μm pore diameter Gelman Acrodisc filter. The amount of protein was determined using the Lowry method using bovine serum albumin as a standard.

Conversion of U(VI)-Carbonate Complex to Insoluble Uranium

*D. desulfuricans* rapidly converted a high concentration of U(VI) to U(IV) as shown in FIG. 1. During the initial states of U(VI) reduction, most of the uranium continued to pass through a 0.2 μm filter. Thus, the initial U(IV) product was soluble or colloidal. However, within 4–6 hours, all of the uranium had been converted to an insoluble form. At this stage, unfiltered samples still contained a small amount of U(VI). This suggests that the precipitation of U(IV) resulted in the coprecipitation of small quantities of U(VI) which were then no longer available for reduction. The insoluble uranium that was formed during U(VI) reduction by *D. desulfuricans* readily settled by gravity from the bulk solution.

Separation of U(VI)-Reducer from Bulk Solution with Semipermeable Membrane

Figure 2:
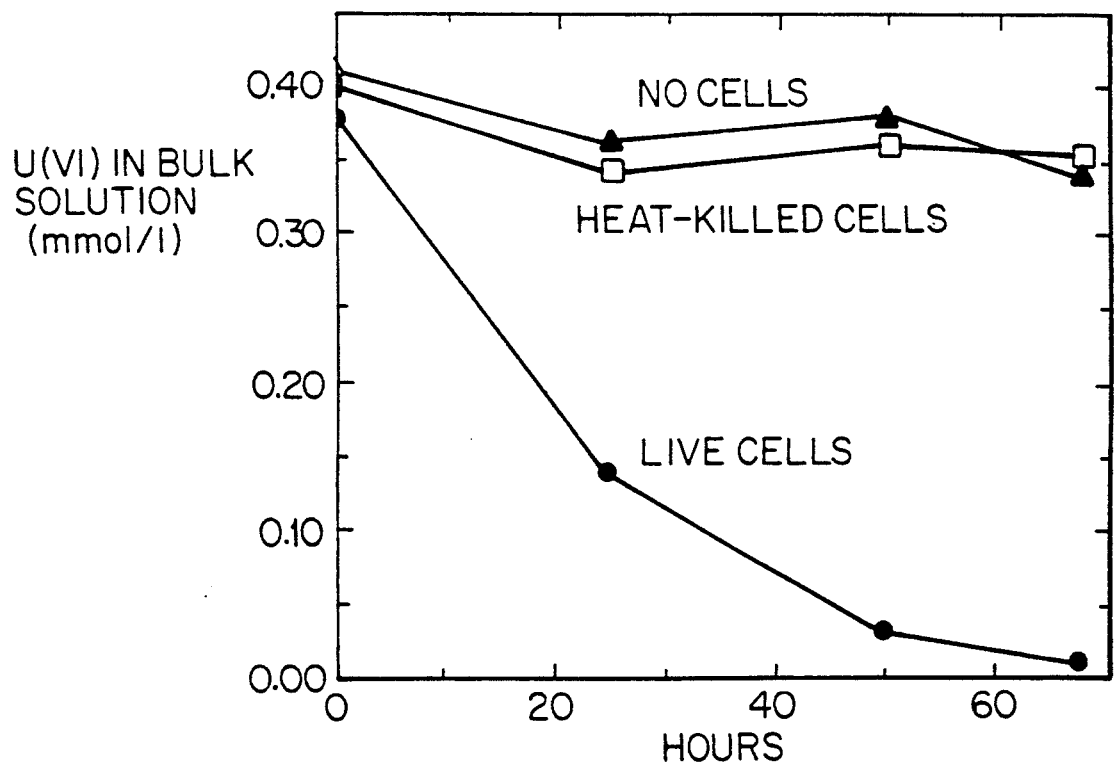
FIG. 2 is a graph of the reduction in U(VI) concentrations in water outside dialysis sacks containing either live or heat killed cells of *D. desulfuricans* or no cells.

For some applications of microbial uranium reduction it is advantageous to maintain the uranium reducers separate from the bulk of the uranium-containing water. For example, this alleviates the need to develop a settling or filtration step to remove the organisms and the uranium precipitate from the water prior to returning it to the environment. In order to evaluate this possibility, *D. desulfuricans* was placed inside a semi-permeable dialysis sack. In the presence of actively metabolizing cells of *D. desulfuricans* there was a steady removal of U(VI) from the external bulk solution over time as shown in FIG. 2. This was accompanied by the accumulation of a black uranium precipitate, uraninite, within the dialysis sack. In contrast, when the dialysis sacks contained no cells or heat-killed cells there was no accumulation of uranium precipitate and only minor loss of U(VI) from the external bulk solution. This small loss from the external solution was presumably due to diffusion of a small amount of U(VI) into the dialysis sacks which initially contained no U(VI).

These results demonstrate that the U(VI)-reducing organisms need not be suspended in bulk, uranium-containing water in order to remove the uranium. Other potential mechanisms would be to immobilize the U(VI)-reducing microorganisms on solid supports.

Tolerance for High Concentrations of U(VI)

Figure 3:
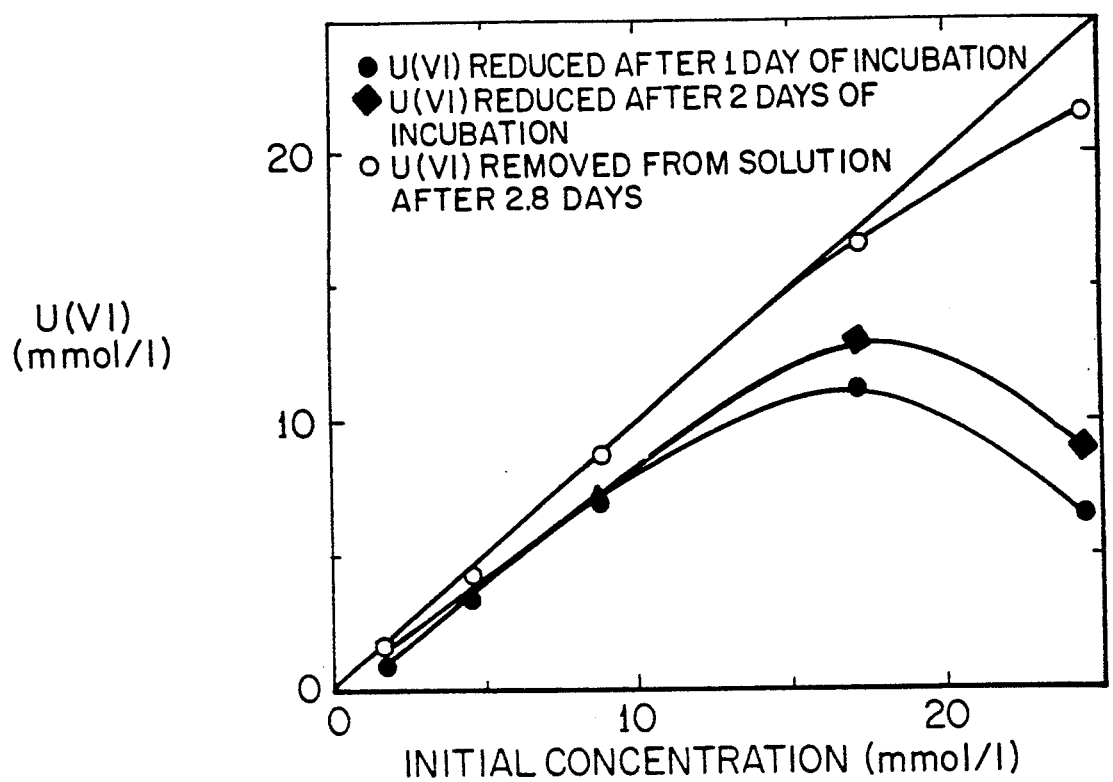
FIG. 3 is a graph of the extent of U(VI) reduction and precipitation in cell suspension receiving high concentrations of U(VI).

*D. desulfuricans* readily reduced U(VI) at concentrations as high as 24 mM as shown in FIG. 3. However, at an initial concentration of 24 mM, the highest concentration tested, the rate of U(VI) reduction was slower than 17 mM. This indicated that U(VI) reduction begins to be inhibited at concentrations between 17–25 mM. U(VI) reduction continued to effectively remove uranium from solution, even at these very high concentrations. Each test bottle contained 3.9 mg of cell protein.

Potential for Inhibition by Other Ions

Figure 4:
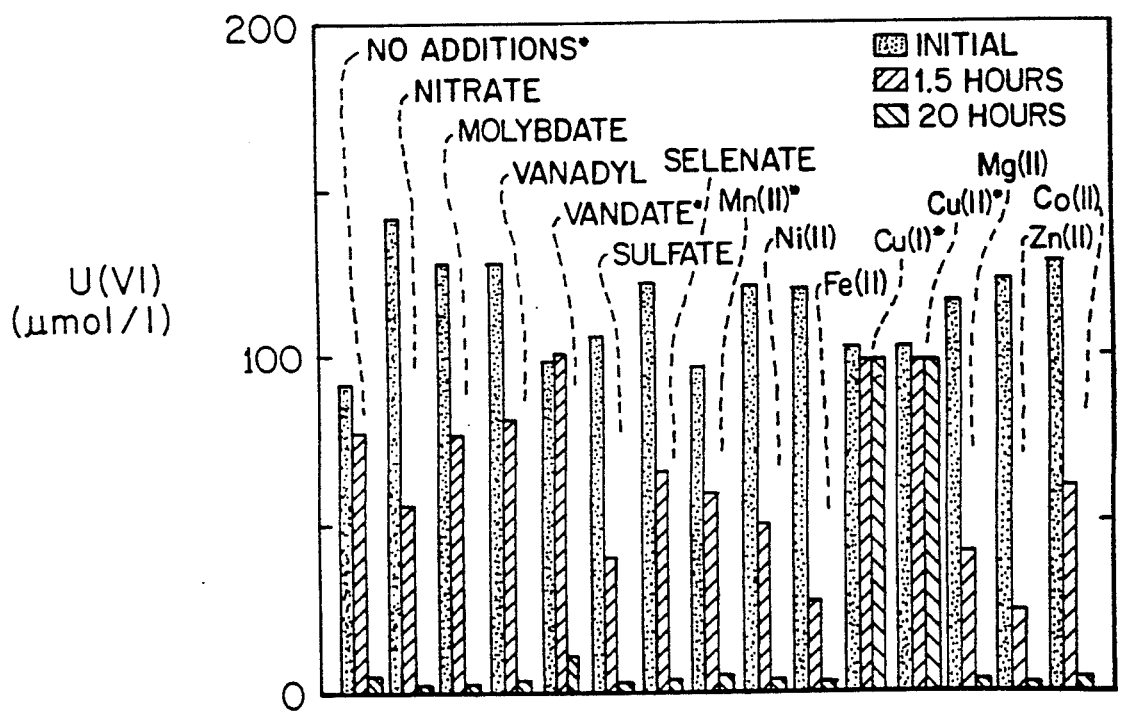
FIG. 4 is a graph showing the effect of various cations and anions on U(VI) reduction.

The ions $Fe^{+2}$, $Mn^{+2}$, $Mg^{+2}$, $Ca^{+2}$, $Zn^{+2}$, $Ca^{+2}$, $SO_4^{-2}$, $Co^{+2}$, $Cu^{+2}$ and $Ni^{+2}$ were tested for their potential to inhibit U(VI) reduction was tested. The results of these tests are shown in FIG. 4. Those tests marked with an * were from an experiment in which there was 0.55 mg of cell protein added per test bottle. The remaining test bottles had 1.28 mg of added cell protein. Most of the compounds tested had no effect on the rate or extent of U(VI) reduction when added at a concentration of 100 μM. Vanadium compounds inhibited U(VI) reduction in short-term (1.5 h) incubations, but not over the long term (20 h). Of all of the compounds tested, only copper, either in the cupric or cuprous state, completely inhibited U(VI) reduction by *D. desulfuricans*.

Figure 5:
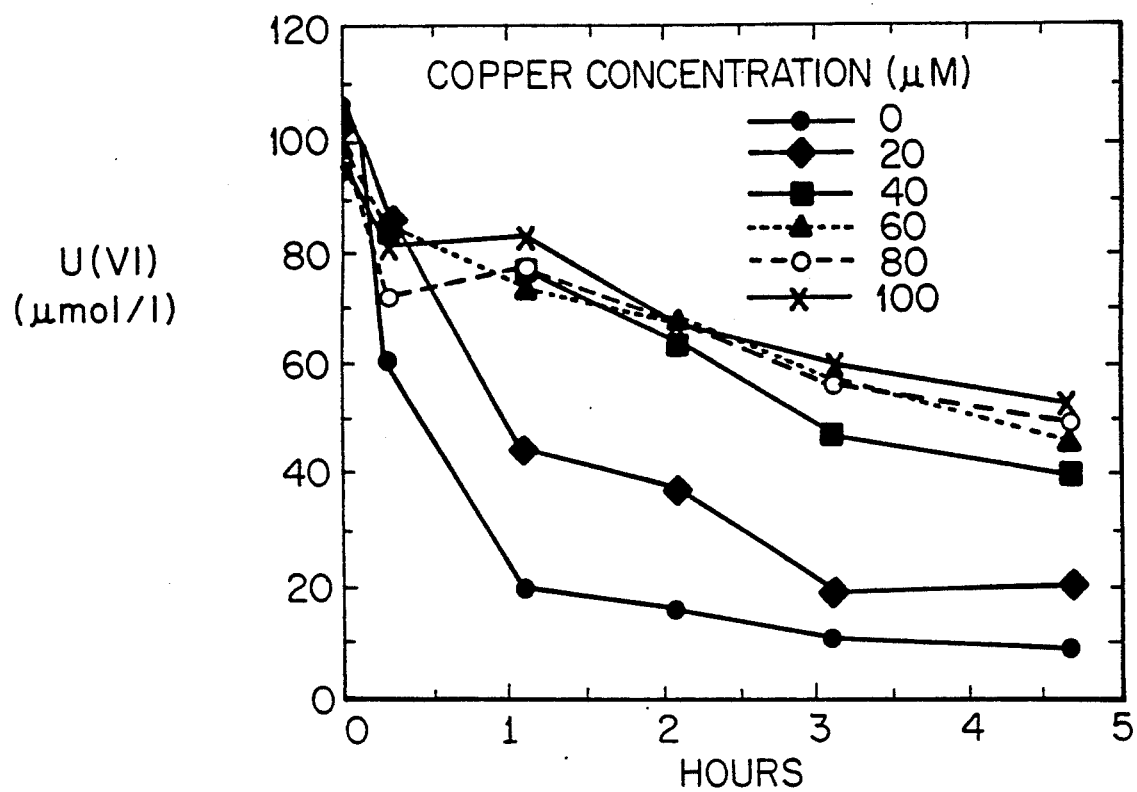
FIG. 5 is a graph showing the reduction of U(VI) in the presences of various concentrations of copper(II) chloride.

The extent of copper inhibition of U(VI) reduction appeared to be dependent on the amount of cell biomass as copper did not completely inhibit U(VI) reduction in a similar experiment that was run with higher protein concentrations as shown in FIG. 5. Each test bottle included 4.8 mg of cell protein. Copper inhibited U(VI) reduction less at concentrations as the copper concentration was lowered below 100 μM. The results indicate that copper is only likely to inhibit microbial U(VI) reduction when attempting to treat waters with exceptionally high copper concentrations. For example, the relatively high concentration of copper in the acidic mine discharge water from a uranium mine did not prevent U(VI) reduction (see below).

Figure 6:
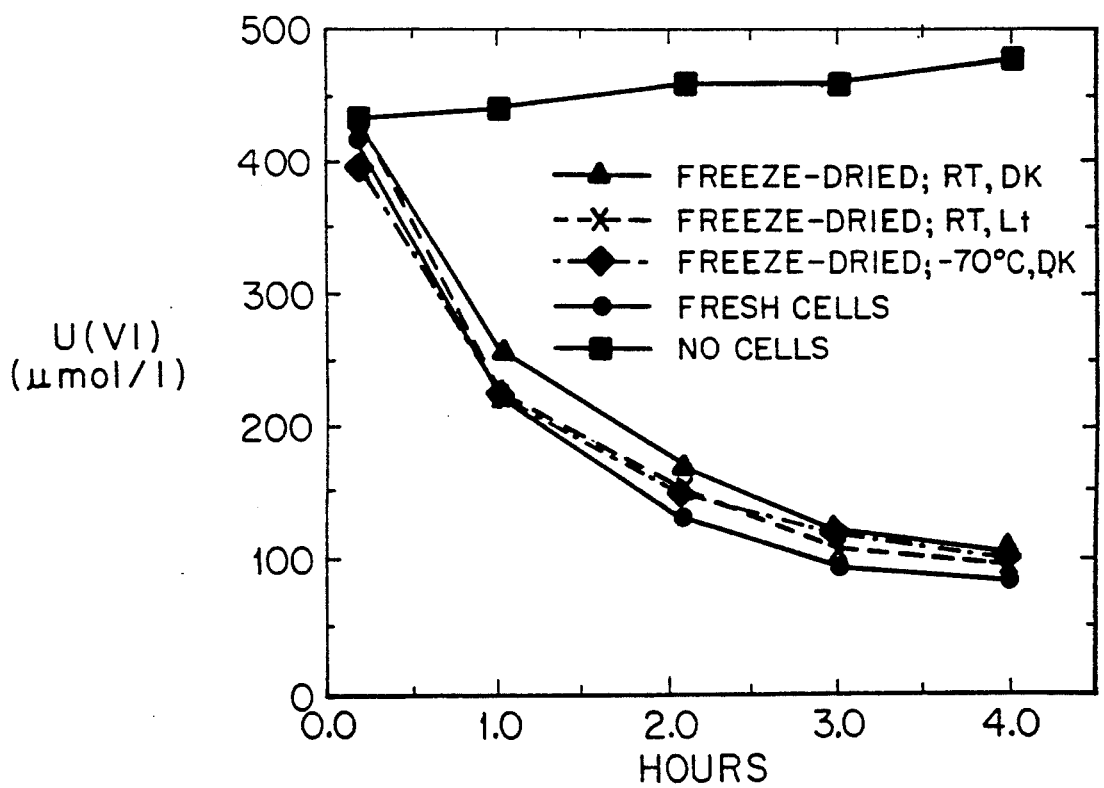
FIG. 6 is a graph showing the reduction of uranium in freshly collected cells and freeze dried cells.

Stability of U(VI)-Reducing Capacity During Air Exposure and Storage of Freeze-Dried Cells A concern in dealing with anaerobic processes is the stability of the cells or enzymes to the inadvertent exposure of the materials to air at some stage of the process. Previous results have demonstrate that U(VI)reducing capacity of *D. desulfuricans* is not affected by temporary exposure (10 min) to air, as described in Lovely, D. R., Philips, E. J. P., *Appl. Environ. Microbiol.* 1992, 58, 850–856. In order to more fully evaluate the tolerance of the U(VI) reducing capacity of *D. desulfuricans* to storage and air exposure, *D. desulfuricans* was freeze-dried under aerobic conditions and stored aerobically at room temperature. The freshly collected cells were at room temperature (RT) and the freeze-dried cells were stored at −70° C., Cells were stored under laboratory lighting (LT) or in the dark (DK). The same amount of cell protein (2.4 mg) was added for each treatment. Remarkably, the freeze-dried cells that had been stored aerobically reduced U(VI) just as rapidly as freshly harvested cells that had been maintained under anaerobic conditions as shown in FIG. 6. These results demonstrate that the mechanism for U(VI) reduction is extremely hardy. Furthermore, since *D. desulfuricans* can be readily mass cultured generation and storage of cells to be used in U(VI) reduction should be relatively inexpensive and technically simple.

Precipitation from Various Contaminated Waters

Figure 7A:
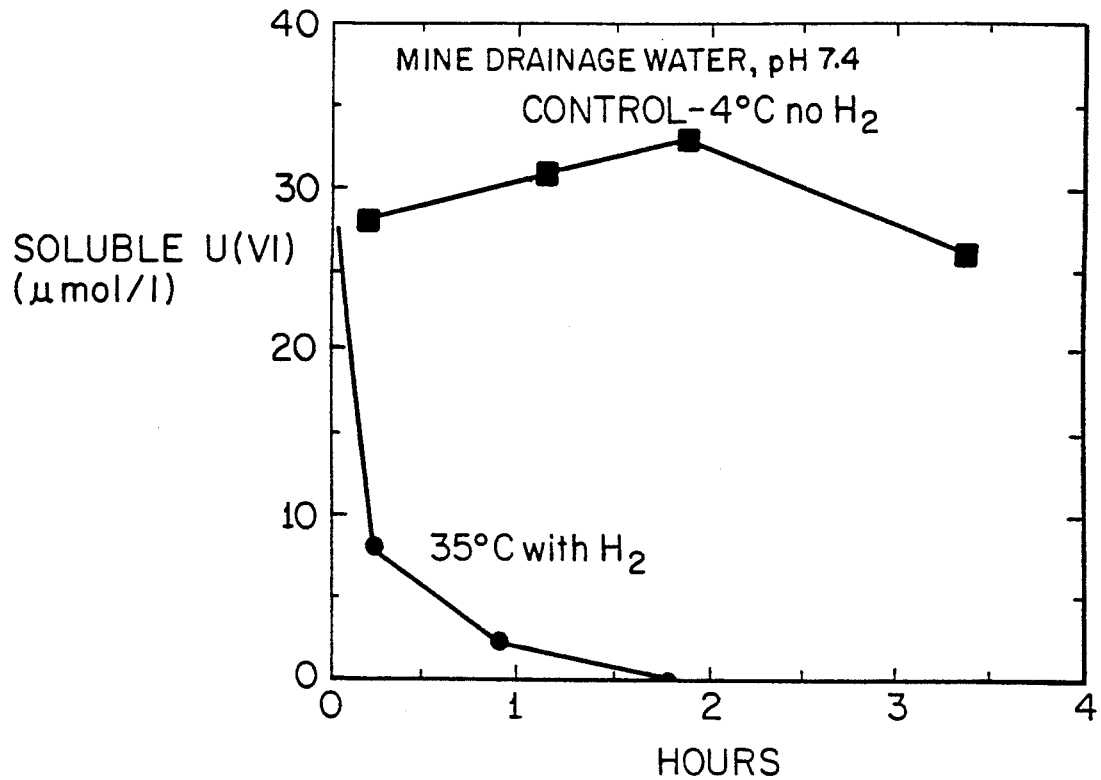
FIG. 7a is a graph showing the reduction of uranium in pH neutral drainage waters from a uranium mine.
Figure 7B:
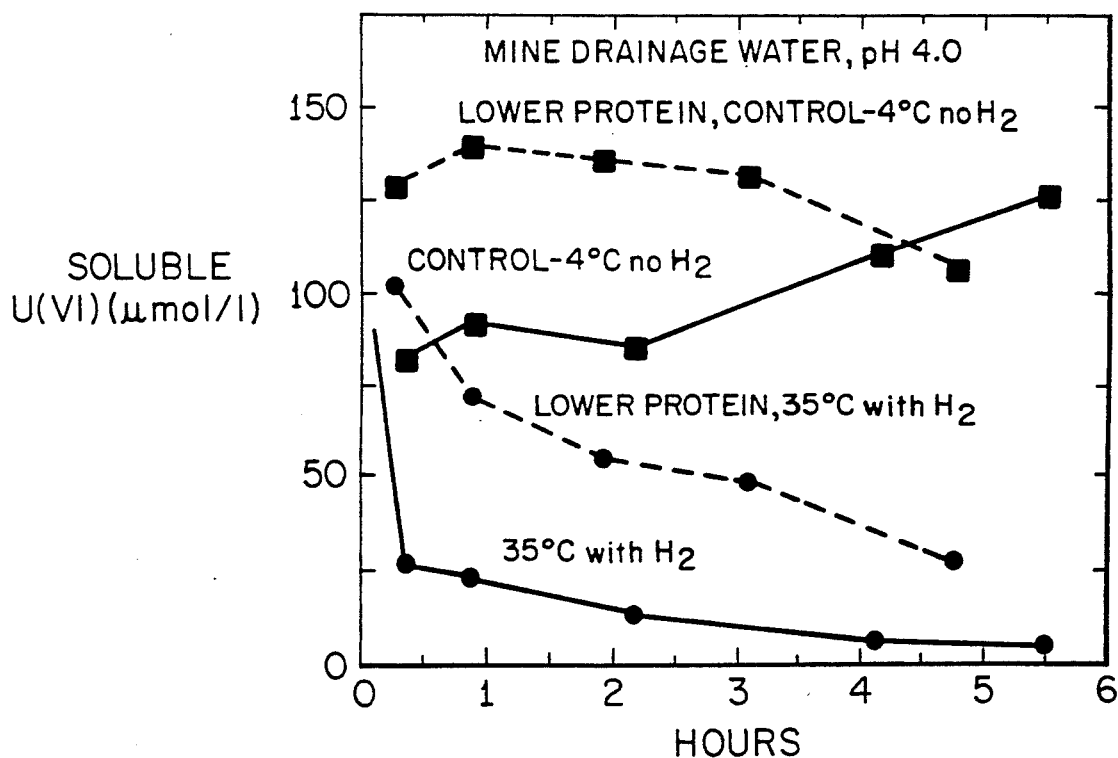
FIG. 7b is a graph showing the reduction of uranium in acidic drainage waters from a uranium mine.
Figure 8A:
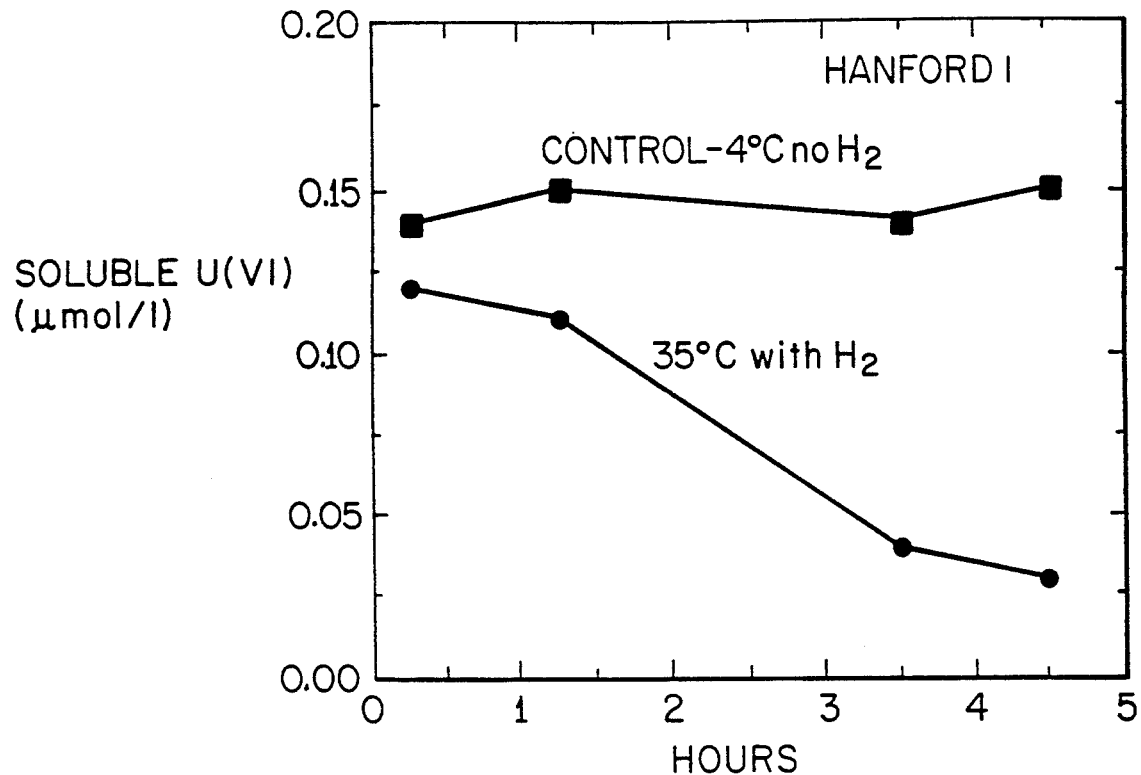
FIG. 8a is a graph showing the reduction in a uranium-bearing groundwater.
Figure 8B:
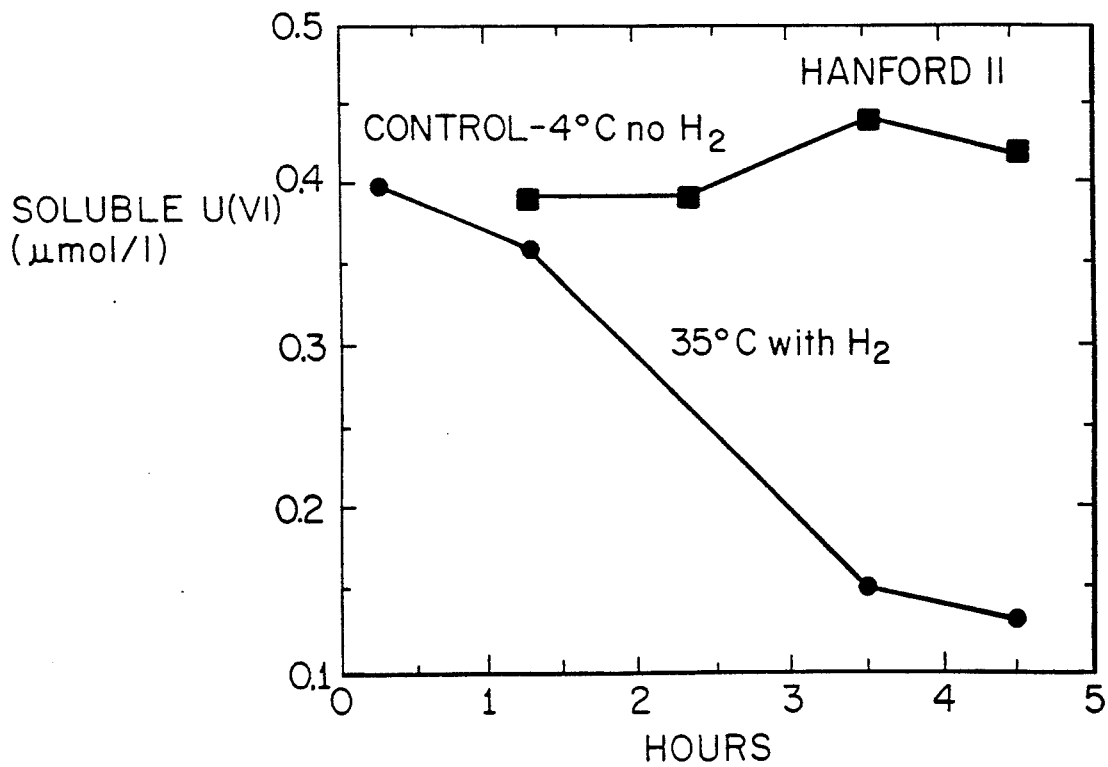
FIG. 8b is a graph showing the reduction in a uranium-bearing groundwater.

*D. desulfuricans* readily removed soluble U(VI) from both circumneutral and low pH drainage waters as shown in FIGS. 7a and 7b and from two uranium-containing groundwaters collected at the Department of Energy site in Hanford, Wash. as shown in FIGS. 8a and 8b. Notably, the low pH (4.0) and relatively high concentrations of copper (4.5 μM), chromium (1.3 μM), aluminum (4,305 μM), strontium (24 μM), and manganese (2,661 μM) did not prevent U(VI) reduction. In FIGS. 7a and 7b, the initial concentration of U(VI) prior to the addition of the cell suspension to the pH 7 and pH 4 waters were 36 and 125 μM, respectively. The protein added to the test bottles was: pH 7 water, 5.4 mg; pH 4 water, 2.8 mg; pH 4 with lower protein, 1.3 mg. In FIGS. 8a and 8b, the initial concentrations of U(VI) prior to the addition of the cell suspensions were 0.2 μM and 0.5 μM for the respective waters. Each of the test bottles received 2 mg of cell protein.

There was little or no U(VI) removal in controls in which the metabolism of the cells was inhibited by not providing an exogenous electron donor and by inhibiting endogenous metabolism by maintaining the cells at 4° C. These results demonstrate that *D. desulfuricans* has the potential to treat a variety of uranium-contaminated waters.

Although the invention has been described relative to exemplary preferred embodiments thereof, it will be understood by those skilled in the art that variations and modifications of these embodiments can be effected without departing from the scope and spirit of the invention.

What is claimed is:

1. A method for precipitating uranium from uranium contaminated water comprising the steps of:
    adding uranium microbial enzymatic reducing microorganisms to uranium contaminated water;
    adding an electron donor to the uranium-contaminated water to cause the uranium to directly react with the microorganisms;
    enzymatically reduction U(VI) in the uranium contaminated water to U(IV) which in turn forms a $UO_2$ precipitate; and separating the $UO_2$ precipitate from the contaminated water.

2. A method according to claim 1, wherein the uranium reducing microorganisms are present in a chamber having a semipermeable membrane for allowing uranium contaminated water to pass into said chamber and for preventing $UO_2$ precipitate from leaving said chamber.

3. A method according to claim 1, wherein said electron donor is selected from the group consisting of acetic acid, hydrogen, formate, pyruvate and lactate.

4. A method according to claim 1, wherein said microorganisms comprise strain *Geobacter metallireducens*.

5. A method according to claim 1, wherein said microorganisms comprise *Shewanella putrefaciens*.

6. A method according to claim 1, wherein said microorganisms comprise *Desulfovibrio desulfuricans*.

7. A method according to claim 1, wherein said microorganisms comprise *Desulfovibrio vulgaris*

8. A method according to claim 1, wherein said microorganisms are maintained at a temperature between about 4° and 50° C.

9. A method according to claim 1, wherein said microorganisms are maintained at a temperature between about 30° and 35° C.

* * * * *